(12) United States Patent
Lu

(10) Patent No.: US 11,378,853 B2
(45) Date of Patent: Jul. 5, 2022

(54) LIQUID CRYSTAL DISPLAY PANEL AND DISPLAY DEVICE

(71) Applicant: TCL CHINA STAR OPTOELECTRONICS TECHNOLOGY CO., LTD., Shenzhen (CN)

(72) Inventor: Jingyi Lu, Shenzhen (CN)

(*) Notice: Subject to any disclaimer, the term of this patent is extended or adjusted under 35 U.S.C. 154(b) by 0 days.

(21) Appl. No.: 16/981,300

(22) PCT Filed: Jun. 5, 2020

(86) PCT No.: PCT/CN2020/094616
§ 371 (c)(1),
(2) Date: Sep. 16, 2020

(87) PCT Pub. No.: WO2021/212620
PCT Pub. Date: Oct. 28, 2021

(65) Prior Publication Data
US 2021/0382359 A1  Dec. 9, 2021

(30) Foreign Application Priority Data
Apr. 21, 2020  (CN) .......................... 202010318456.8

(51) Int. Cl.
G02F 1/1362 (2006.01)
G02F 1/1343 (2006.01)
G02F 1/1335 (2006.01)

(52) U.S. Cl.
CPC .... G02F 1/136218 (2021.01); G02F 1/13439 (2013.01); G02F 1/133512 (2013.01); G02F 1/133514 (2013.01); G02F 1/134345 (2021.01)

(58) Field of Classification Search
CPC ......... G02F 1/136218; G02F 1/134345; G02F 1/133512; G02F 1/133514; G02F 1/13439; G02F 1/13606; G02F 1/136286
See application file for complete search history.

(56) References Cited

U.S. PATENT DOCUMENTS 9,164,311 B2 * 10/2015 Hibayashi ................ G02B 5/20
9,690,131 B2 * 6/2017 Itou .................... G02F 1/136286
2004/0223101 A1 * 11/2004 Yeh .................... G02F 1/133555
349/114

(Continued)

FOREIGN PATENT DOCUMENTS

CN  101308303 A  11/2008
CN  104035247 A  9/2014

(Continued)

*Primary Examiner* — Hoan C Nguyen

(57) ABSTRACT

A liquid crystal display panel and a display device are provided. The liquid crystal display panel includes an array substrate and a color filter substrate disposed oppositely, and liquid crystals. The array substrate includes common electrode lines, gate electrodes, and a transparent electrode layer. In a direction parallel to a plane where the array substrate is located, spacing areas are provided between the common electrode lines and the gate electrodes; the transparent electrode layer includes shading electrodes and pixel electrodes, the shading electrodes and the pixel electrodes are electrically connected, and the shading electrodes cover the spacing areas.

15 Claims, 6 Drawing Sheets

(56) References Cited

U.S. PATENT DOCUMENTS

| | | | |
|---|---|---|---|
| 2005/0200791 A1* | 9/2005 | Ahn | G02F 1/13439 349/141 |
| 2007/0019137 A1* | 1/2007 | Kim | G02F 1/1341 349/114 |
| 2008/0186434 A1 | 8/2008 | Yun et al. | |
| 2013/0002625 A1* | 1/2013 | Liao | G02F 1/134309 345/205 |
| 2017/0176825 A1 | 6/2017 | Cao et al. | |
| 2019/0086707 A1* | 3/2019 | Enomoto | G02F 1/133555 |

FOREIGN PATENT DOCUMENTS

| | | |
|---|---|---|
| CN | 104516167 A | 4/2015 |
| CN | 104597643 A | 5/2015 |
| CN | 104880852 A | 9/2015 |
| CN | 105182631 A | 12/2015 |

* cited by examiner

LIQUID CRYSTAL DISPLAY PANEL AND DISPLAY DEVICE

FIELD OF INVENTION

The present disclosure relates to the field of display technology, in particular to a liquid crystal display panel and a display device.

BACKGROUND OF INVENTION

Currently, in a pixel design of liquid crystal display (LCD), a black matrix is generally used to shield opaque areas to prevent pixels from leaking light in a dark state.

Technical Problem

Due to influence of electric fields near gate electrodes, liquid crystals near the gate electrodes will be abnormally deflected. When a panel is pressed or squeezed, an array substrate and a color filter substrate are offset and abnormal alignment occurs. The black matrix cannot cover the offset areas, resulting in light leakage from pixels near the gate electrodes, which greatly reduces image quality of the display panel.

SUMMARY OF INVENTION

The present disclosure provides a liquid crystal display panel and a display device to solve light leakage problem caused by abnormal deflection of liquid crystals near the gate electrodes.

The present disclosure provides a liquid crystal display panel, which comprises an array substrate and a color filter substrate that are disposed oppositely, and liquid crystals disposed between the array substrate and the color filter substrate, the array substrate includes common electrode lines, gate electrodes and a pixel electrode layer, the pixel electrode layer is disposed on the common electrode lines and the gate electrodes, and spacing areas are provided between the common electrode lines and the gate electrodes in a direction parallel to a plane of the array substrate;

The pixel electrode layer includes shading electrodes and transparent electrodes, the shading electrodes and the transparent electrodes are electrically connected, and the shading electrodes cover the spacing areas;

The shading electrodes and the transparent electrodes are disposed in a same layer, the shading electrodes are electrically connected to the transparent electrodes through vias, and the patterns of the shading electrodes are stripe-shaped.

In the liquid crystal display panel of the present disclosure, the common electrode lines and the gate electrodes are disposed in a same layer;

In the direction parallel to the plane where the array substrate is located, preset horizontal distances are provided between the shading electrodes and the gate electrodes.

In the liquid crystal display panel of the present disclosure, the color filter substrate includes a black matrix, and the black matrix is disposed at a side of the color filter substrate close to the array substrate;

In a direction perpendicular to the plane where the array substrate is located, the black matrix and the transparent electrodes are staggered.

In the liquid crystal display panel of the present disclosure, the black matrix includes first boundary lines, the first boundary lines are located at sides of the black matrix close to the transparent electrodes, the common electrode lines include second boundary lines, and the second boundary lines are located at sides of the common electrode lines close to the gate electrodes;

In the direction perpendicular to the plane where the array substrate is located, distances from the first boundary lines to the gate electrodes are not less than distances from the second boundary lines to the gate electrodes.

In the liquid crystal display panel of the present disclosure, the shading electrodes and the transparent electrodes are integrally formed.

In the liquid crystal display panel of the present disclosure, the transparent electrodes include main pixel electrodes and sub-pixel electrodes, and the main pixel electrodes and the sub-pixel electrodes are spaced apart;

The shading electrodes include first shading electrodes and second shading electrodes, the first shading electrodes are electrically connected to the main pixel electrodes, and the second shading electrodes are electrically connected to the sub-pixel electrodes.

In the liquid crystal display panel of the present disclosure, orthographic projections of the first shading electrodes on the plane where the array substrate is located are first projections, and orthographic projections of the second shading electrodes on the plane where the array substrate is located are second projections, and the first projections and the second projections are symmetrically arranged with respect to orthographic projections of the gate electrodes on the plane where the array substrate is located.

The present disclosure also provides a liquid crystal display panel, which comprises an array substrate and a color filter substrate arranged oppositely, and liquid crystals disposed between the array substrate and the color filter substrate, the array substrate includes common electrode lines, gate electrodes and a pixel electrode layer, the pixel electrode layer is disposed on the common electrode lines and the gate electrodes, and spacing areas are provided between the common electrode lines and the gate electrodes in a direction parallel to the plane where the array substrate is located;

The pixel electrode layer includes shading electrodes and transparent electrodes, the shading electrodes and the transparent electrodes are electrically connected, and the shading electrodes cover the spacing areas.

In the liquid crystal display panel of the present disclosure, the common electrode lines and the gate electrodes are disposed in a same layer;

In the direction parallel to the plane where the array substrate is located, preset horizontal distances are provided between the shading electrodes and the gate electrodes.

In the liquid crystal display panel of the present disclosure, the color filter substrate includes a black matrix, and the black matrix is disposed at a side of the color filter substrate close to the array substrate;

In a direction perpendicular to the plane where the array substrate is located, the black matrix and the transparent electrodes are staggered.

In the liquid crystal display panel of the present disclosure, the black matrix includes first boundary lines, the first boundary lines are located at sides of the black matrix close to the transparent electrodes, the common electrode lines include second boundary lines, and the second boundary lines are located at sides of the common electrode lines close to the gate electrodes;

In the direction perpendicular to the plane where the array substrate is located, distances from the first boundary lines to the gate electrodes are not less than distances from the second boundary lines to the gate electrodes.

In the liquid crystal display panel of the present disclosure, the shading electrodes and the transparent electrodes are disposed in a same layer, and the shading electrodes are electrically connected to the transparent electrodes through vias.

In the liquid crystal display panel of the present disclosure, the shading electrodes and the transparent electrodes are integrally formed.

In the liquid crystal display panel of the present disclosure, the transparent electrodes include main pixel electrodes and sub-pixel electrodes, and the main pixel electrodes and the sub-pixel electrodes are spaced apart;

The shading electrodes include first shading electrodes and second shading electrodes, the first shading electrodes are electrically connected to the main pixel electrodes, and the second shading electrodes are electrically connected to the sub-pixel electrodes.

In the liquid crystal display panel of the present disclosure, orthographic projections of the first shading electrodes on the plane where the array substrate is located are first projections, and orthographic projections of the second shading electrodes on the plane where the array substrate is located are second projections, the first projections and the second projections are symmetrically arranged with respect to orthographic projections of the gate electrodes on the plane where the array substrate is located.

In the liquid crystal display panel of the present disclosure, the patterns of the shading electrodes are stripe-shaped.

The present disclosure also provides a display device, which comprises a liquid crystal display panel, the liquid crystal display panel includes an array substrate and a color filter substrate disposed oppositely, and liquid crystals disposed between the array substrate and the color filter substrate, the array substrate includes common electrode lines, gate electrodes, and a pixel electrode layer, the pixel electrode layer is disposed on the common electrode lines and the gate electrodes, and spacing area are provided between the common electrode lines and the gate electrodes in a direction parallel to a plane where the array substrate is located;

The pixel electrode layer includes shading electrodes and transparent electrodes, the shading electrodes and the transparent electrodes are electrically connected, and the shading electrodes cover the spacing areas.

In the display device of the present disclosure, the common electrode lines and the gate electrodes are disposed in a same layer;

In the direction parallel to the plane where the array substrate is located, preset horizontal distances are provided between the shading electrodes and the gate electrodes.

In the display device of the present disclosure, the color filter substrate includes a black matrix, and the black matrix is disposed at a side of the color filter substrate close to the array substrate;

In a direction perpendicular to the plane where the array substrate is located, the black matrix and the transparent electrodes are staggered.

In the display device of the present disclosure, the black matrix includes first boundary lines, the first boundary lines are located at sides of the black matrix close to the transparent electrodes, the common electrode lines include second boundary lines, and the second boundary lines are located at sides of the common electrode lines close to the gate electrodes;

In the direction perpendicular to the plane where the array substrate is located, distances from the first boundary lines to the gate electrodes are not less than distances from the second boundary lines to the gate electrodes.

Beneficial Effect

Compared with the liquid crystal display panel in the prior art, the liquid crystal display panel provided in the present disclosure covers the light leakage areas between the gate electrodes and the common electrode lines with shading electrodes, and makes the shading electrodes and the transparent electrodes have the same potential, which solves light leakage problem caused by abnormal deflection of liquid crystals near the gate electrodes, and improves image quality of the liquid crystal display panel.

DESCRIPTION OF DRAWINGS

In order to more clearly describe technical solutions in embodiments of the present disclosure, the following will briefly introduce the drawings used in the description of the embodiments. Obviously, the drawings in the following description are only some embodiments of the present disclosure. For those skilled in the art, other drawings can be obtained based on these drawings without creative work.

DETAILED DESCRIPTION OF PREFERRED EMBODIMENTS

Figure 1:
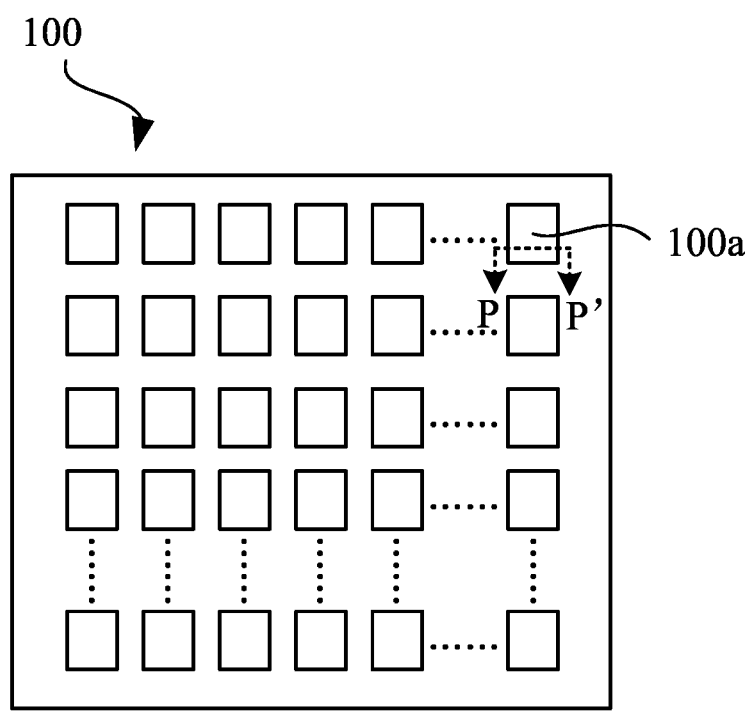
FIG. 1 is a schematic diagram of a planar structure of a liquid crystal display panel provided in a first embodiment of the present disclosure.

Technical solutions in embodiments of the present disclosure will be clearly and completely described below in conjunction with drawings in the embodiments of the present disclosure. It is clear that the described embodiments are part of embodiments of the present disclosure, but not all embodiments. Based on the embodiments of the present disclosure, all other embodiments to those of ordinary skill in the premise of no creative efforts obtained, should be considered within the scope of protection of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

In the description of the present disclosure, it should be noted that unless otherwise clearly defined and limited, the terms "mounted", "connected/coupled", and "connection" should be interpreted broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those skilled in the art can understand the specific meanings of the above-mentioned terms in the present disclosure according to circumstances.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that that horizontal height of the first feature is lower than that of the second feature.

The following description provides various embodiments or examples for implementing various structures of the present disclosure. To simplify the description of the present disclosure, parts and settings of specific examples are described as follows. Certainly; they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art.

It should be noted that, a sub-pixel unit in the present disclosure includes a main pixel electrode area, a sub-pixel electrode area, and a thin film transistor driving area disposed between the main pixel electrode area and the sub-pixel electrode area, or the sub-pixel unit may only include a pixel electrode area and a thin film transistor driving area. The following embodiments of the present disclosure only illustrate the former as an example, but are not limited thereto.

In addition, a structure of the sub-pixel unit in the drawings of the present disclosure is only an example, and it is used to conveniently describe the following embodiments of the present disclosure, but should not be understood as a limitation of the present disclosure.

Please refer to FIG. 1 to FIG. 4. A liquid crystal display panel 100 provided in a first embodiment of the present disclosure includes an array substrate 11 and a color filter substrate 12 disposed oppositely, and liquid crystals 13 disposed between the array substrate 11 and the color filter substrate 12. The array substrate 11 includes common electrode lines 14, gate electrodes 15, and a pixel electrode layer 16. The pixel electrode layer 16 is disposed on the common electrode lines 14 and the gate electrodes 15. In a direction parallel to the plane where the array substrate 11 is located, spacing areas AA' are provided between the common electrode lines 14 and the gate electrodes 15. The pixel electrode layer 16 includes shading electrodes 161 and transparent electrodes 162. The shading electrodes 161 and the transparent electrodes 162 are electrically connected, and the shading electrodes 161 cover the spacing areas AA'.

Therefore, in the liquid crystal display panel 100 provided in the first embodiment of the present disclosure, the shading electrodes 161 cover the spacing spaces AA' between the gate electrodes 15 and the common electrode lines 14, and the shading electrodes 161 electrically connect to the transparent electrodes 162, so that the shading electrodes 161 and the transparent electrodes 162 have the same potential. Thus, in the dark state, liquid crystals 13 located at the spacing areas AA' have the same electric fields as liquid crystals 13 in pixel opening areas, which prevents the liquid crystals 13 at the spacing area AA' from being abnormally deflected due to the influence of the electric fields near the gate electrodes 15. When the panel is pressed or squeezed, even if the array substrate 11 and the color filter substrate 12 are offset and the abnormal alignment occurs, the liquid crystals 13 in the offset areas can maintain the dark and opaque state, thereby effectively preventing light leakage in the offset areas, and improving the image quality of the liquid crystal display panel.

Figure 2:
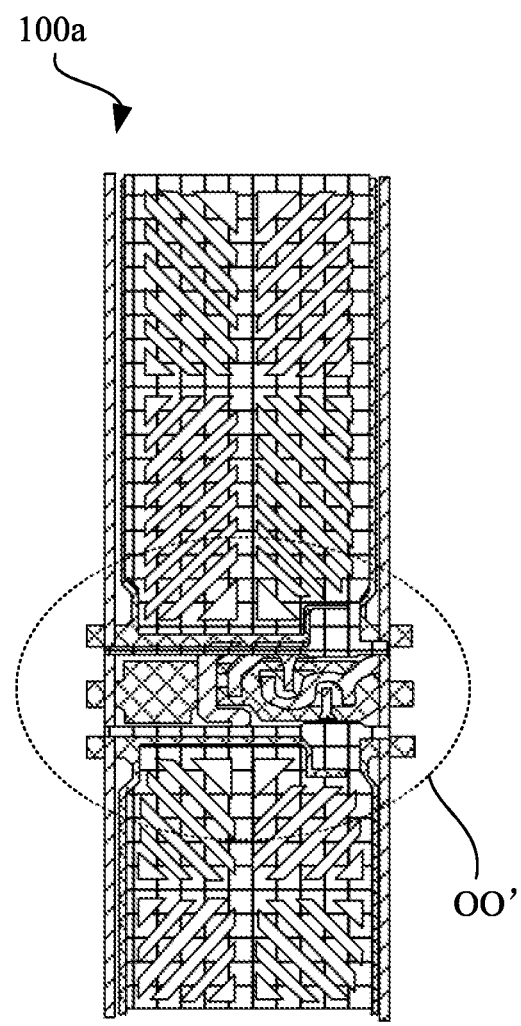
FIG. 2 is a schematic diagram of a structure of a sub-pixel unit in the liquid crystal display panel provided in the first embodiment of the present disclosure.
Figure 3:
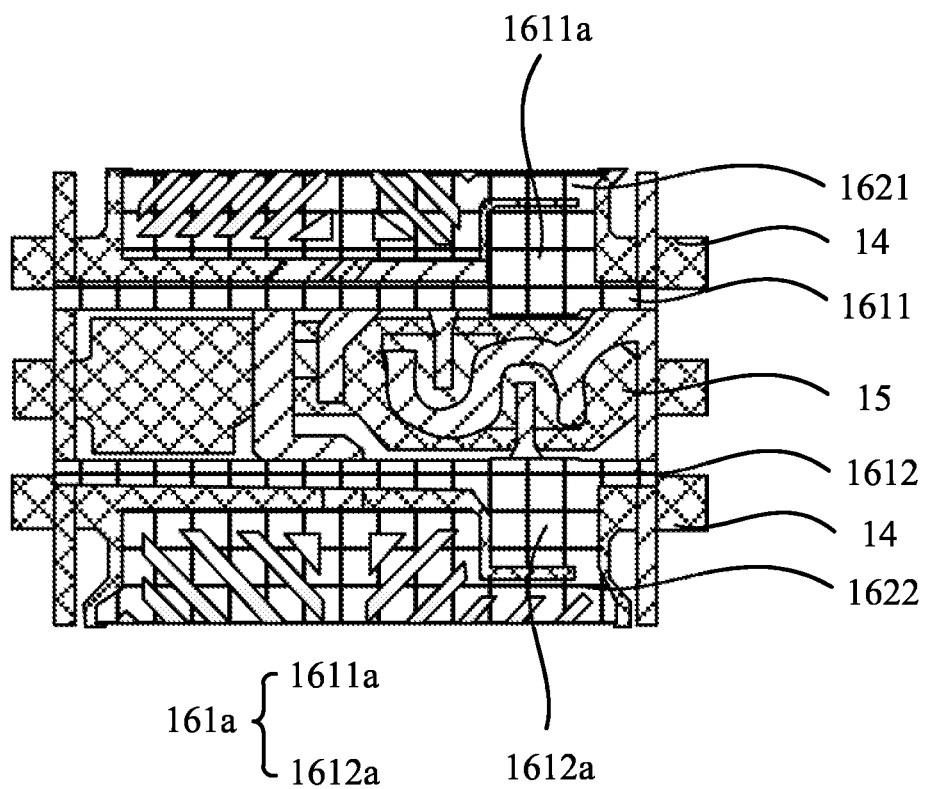
FIG. 3 is a schematic diagram of an enlarged structure at OO' in FIG. 2.

Please continue to refer to FIG. 1 to FIG. 3. The liquid crystal display panel 100 includes a plurality of sub-pixel units 100a arranged in an array. Specifically, the sub-pixel units 100a include main pixel electrode areas and sub-pixel electrode areas, and thin film transistor driving area (not marked in the figure) disposed between the main pixel electrode areas and the sub-pixel electrode areas. The shading electrodes 161 are located in the thin film transistor driving areas.

Figure 4:
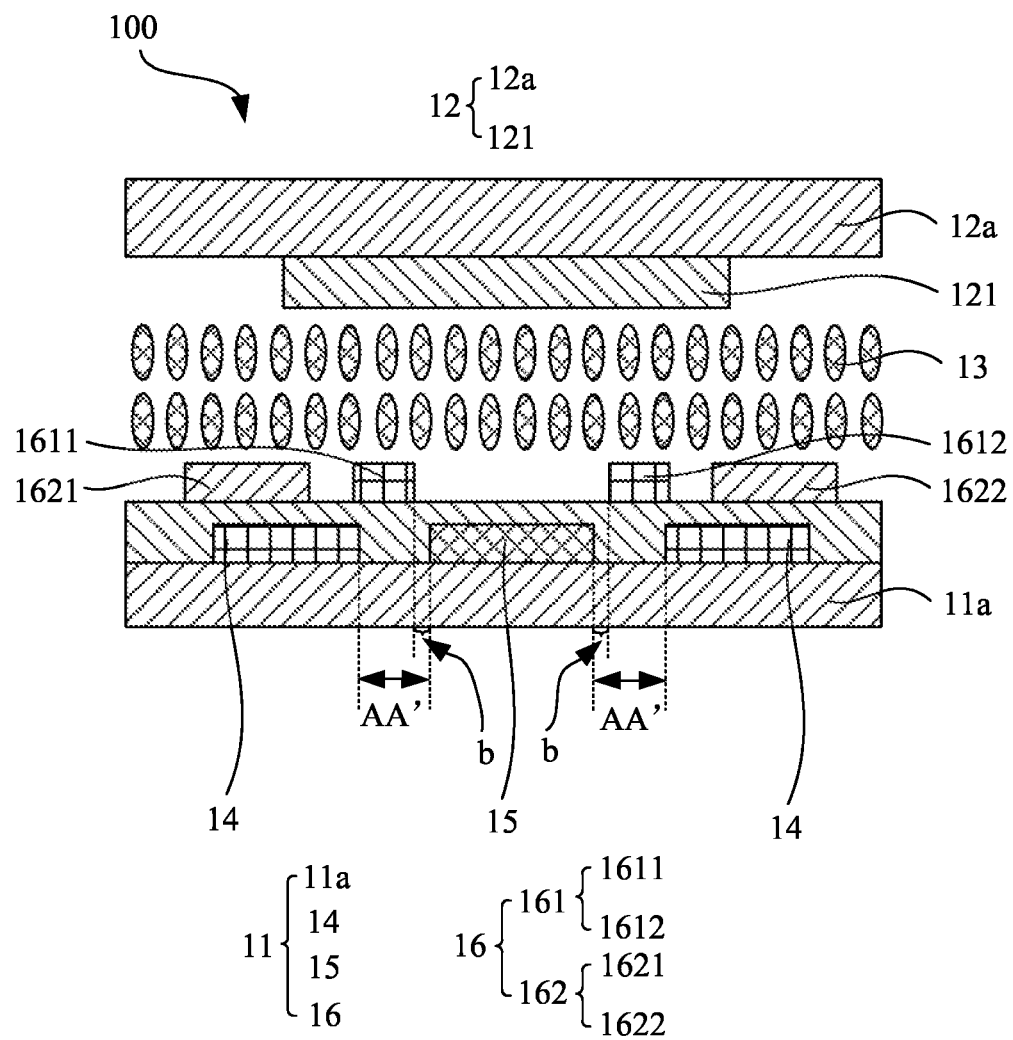
FIG. 4 is a schematic diagram of a cross-sectional structure taken along line PP' in FIG. 1.

As shown in FIG. 4, specifically, the array substrate 11 further includes a first substrate 11a. The first substrate 11a may be a glass substrate. The color filter substrate 12 includes a second substrate 12a and a black matrix 121 arranged in sequence. The black matrix 121 is disposed at a side of the color filter substrate 12 close to the array substrate 11. In addition, the array substrate 11 also includes film structures (not shown in the figure) such as source electrodes, drain electrodes, semiconductor layers, and interlayer insulating layers, and the color filter substrate 12 also includes film structures (not shown in the figure) such as color filter layers and common electrode layers. The specific structures of the array substrate 11 and the color filter substrate 12 can be referred to the prior art, which will not be repeated here.

Please continue to refer to FIG. 3 and FIG. 4. In the first embodiment of the present disclosure, the common electrode lines 14 and the gate electrodes 15 are disposed in the same layer. The gate electrodes 15 are located between adjacent common electrode lines 14. In some embodiments, the common electrode lines 14 and the gates 15 may also be disposed in different layers, which is not limited in the present disclosure.

In the first embodiment of the present disclosure, the shading electrodes 161 partially cover the spacing areas AA'. Specifically, in a direction parallel to the plane where the array substrate 11 is located, preset horizontal distances b are provided between the shading electrodes 161 and the gate electrodes 15.

In the first embodiment of the present disclosure, the preset horizontal distances b are greater than zero. Specific values of the preset horizontal distances b are set according to actual application conditions, which is not limited in the present disclosure.

The above arrangement allows certain spaces between the shading electrodes 161 and the gate electrodes 15 to prevent parasitic capacitances between the shading electrodes 161 and the gate electrodes 15. Meanwhile, the above arrangement can also reduce the alignment accuracy error between the array substrate 11 and the color filter substrate 12, and prevent color shift problem caused by the offset of the array substrate 11 and the color filter substrate 12.

Further, in the embodiment of the present disclosure, orthographic projections of the shading electrodes 161 on the plane where the array substrate 100 is located and orthographic projections of the common electrode lines 14 on the plane where the array substrate 100 is located partially overlap. This arrangement can generate storage capacitors through the overlapping portions of the shading electrodes 161 and the common electrode lines 14.

In some embodiments, the shading electrodes 161 completely cover the spacing areas AA'. Specifically, the shading electrodes 161 exactly completely cover the spacing areas AA', or the orthographic projections of the shading electrodes 161 on the plane where the array substrate is located and the orthographic projections of the gate electrodes 15 on the plane where the array substrate 11 is located partially overlap. The above arrangement can completely shield the light leakage areas near the gate electrodes 15 and thereby minimize the probability of abnormal deflection of liquid crystals 13 in this area.

Alternately, the patterns of the shading electrodes 161 are stripe shapes, square shapes, or other irregular shapes. The specific patterns of the shading electrodes 161 can be set according to actual conditions, which is not limited in the present disclosure.

In the first embodiment of the present disclosure, the patterns of the shading electrodes 161 are stripe-shaped.

In the first embodiment of the present disclosure, the shading electrodes 161 and the transparent electrodes 162 are disposed in the same layer. In addition, in some embodiments, the shading electrodes 161 and the transparent electrodes 162 may also be disposed in different layers, which will not be repeated here.

Further, the shading electrodes 161 are electrically connected to the transparent electrodes 162 through vias 161a, as shown in FIG. 3. This arrangement makes the shading electrodes 161 and the transparent electrodes 162 have the same potential, and when the panel is in the dark state, liquid crystals 13 in the spacing areas AA' remain the dark and opaque state under the actions of the electric fields formed by the shading electrodes 161 and the common electrodes on the color filter substrate 12, therefore preventing the light leakage.

Specifically, the transparent electrodes 162 are electrically connected to the drain electrodes in the array substrate 11 through the vias 161a, the vias 161a are filled with transparent conductive material, and the shading electrodes 161 can be electrically connected to the transparent electrodes 162 through the vias 161a. It can be understood that the shading electrodes 161 may also be electrically connected to the transparent electrodes 162 in other ways, and this embodiment cannot be understood as a limitation of the present disclosure.

Please continue to refer to FIG. 3 and FIG. 4. In the first embodiment of the present disclosure, the shading electrodes 161 and the transparent electrodes 162 are integrally formed. This configuration can reduce the number of covers and simplify process, thereby helping to save process costs. In addition, in some embodiments, the shading electrodes 161 and the transparent electrodes 162 may also be separate structures, which will not be repeated here.

Further, the transparent electrodes 162 include main pixel electrodes 1621 and sub-pixel electrodes 1622. The main pixel electrodes 1621 and the sub-pixel electrodes 1622 are spaced apart. The shading electrodes 161 include first shading electrodes 1611 and second shading electrodes 1612. The first shading electrodes 1611 are electrically connected to the main pixel electrodes 1621. The second shading electrodes 1612 are electrically connected to the sub-pixel electrodes 1622.

Specifically, the first shading electrodes 1611 are electrically connected to the main pixel electrodes 1621 through vias 1611a on the main electrode areas. The first shading electrodes 1611 and the main pixel electrodes 1621 are integrally formed. The second shading electrodes 1612 are electrically connected to the sub-pixel electrodes 1622 through vias 1612a on the sub-electrode areas. The second shading electrodes 1612 and the sub-pixel electrodes 1622 are integrally formed.

Further, the orthographic projections of the first shading electrodes 1611 on the plane where the array substrate 11 is located are first projections. The orthographic projections of the second shading electrodes 1612 on the plane where the array substrate 11 is located are second projections. The first projections and the second projections are symmetrically arranged with respect to the orthographic projections of the gate electrodes 15 on the plane where the array substrate 11 is located. In this arrangement, the first shading electrodes 1611 and the second shading electrodes 1612 are symmetrically disposed to ensure the same electric fields on both sides of the thin film transistor areas, and reduce the possibility of dark stripes caused by abnormal deflection of the liquid crystals 13.

In the liquid crystal display panel 100 provided in the first embodiment of the present disclosure, the shading electrodes 16 cover the spacing areas AA' between the gate electrodes 15 and the common electrode lines 14, and electrically connect to the transparent electrodes 162, so that the shading electrodes 161 and the transparent electrodes 162 have the same potential, therefore, in the dark state, the electric fields of the liquid crystals 13 in the spacing areas AA' remain same with the electric fields of the liquid crystals 13 in the pixel opening areas, and abnormal deflections of the liquid crystals 13 due to the influence of the electric fields near the gate electrodes 15 are prevented. When the panel is pressed or squeezed, even if the array substrate 11 and the color filter substrate 12 are offset and abnormal alignment occurs, the liquid crystals 13 in the offset areas can maintain the dark and opaque state, thereby effectively preventing light leakage in the offset areas, and improving the image quality of the liquid crystal display panel.

Figure 5:
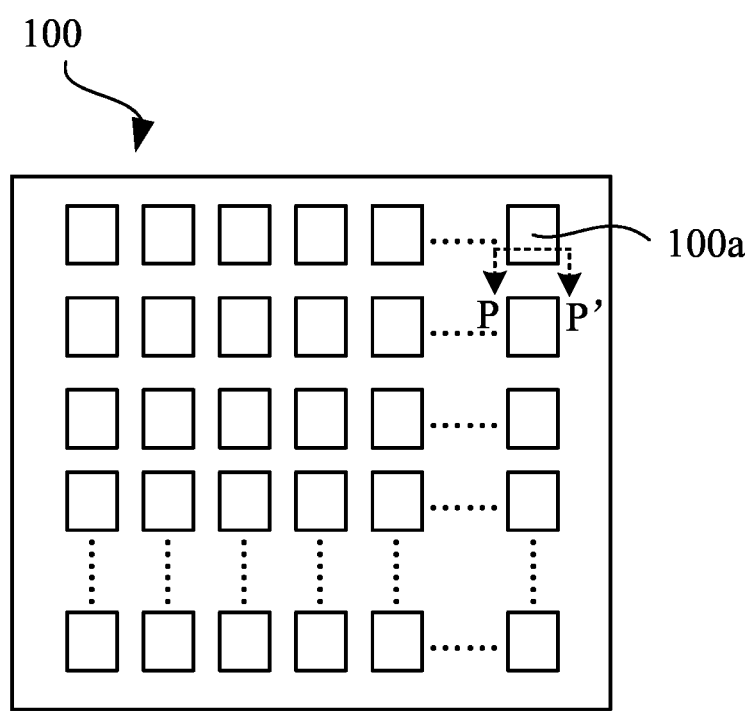
FIG. 5 is a schematic diagram of a planar structure of a liquid crystal display panel provided in a second embodiment of the present disclosure.
Figure 6:
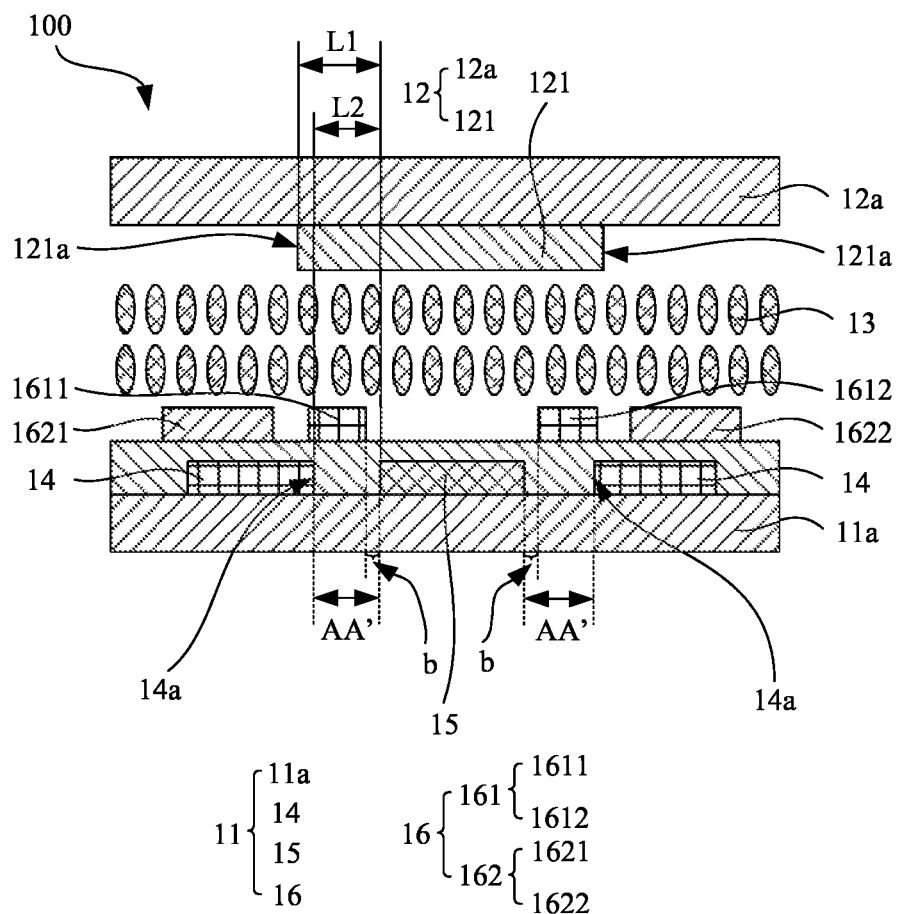
FIG. 6 is a schematic diagram of a cross-sectional structure taken along line PP' in FIG. 5.

Please refer to FIG. 5 and FIG. 6. FIG. 5 is a schematic diagram of a planar structure of a liquid crystal display panel provided in a second embodiment of the present disclosure; and FIG. 6 is a schematic diagram of a cross-sectional structure along the line PP' in FIG. 5.

The difference between the liquid crystal display panel 100 provided in the second embodiment of the present disclosure and the first embodiment is that, the black matrix 121 and the transparent electrodes 162 are staggered in a direction perpendicular to the plane where the array substrate 11 is located.

Specifically, in the direction perpendicular to the plane where the array substrate 11 is located, the black matrix 121 is staggered from the main pixel electrodes 1621 and the sub pixel electrodes 1622, respectively. This configuration can increase the pixel aperture ratio, thereby increasing the transmittance of the liquid crystal display panel, and further improving the display quality of the liquid crystal display panel.

In the second embodiment of the present disclosure, the black matrix 121 includes first boundary lines 121a. The first boundary lines 121a are located at sides of the black matrix 121 close to the transparent electrode 162. The common electrode lines 14 include second boundary lines 14a. The second boundary lines 14a are located at sides of the common electrode lines 14 close to the gate electrodes 15. In the direction perpendicular to the plane where the array substrate 11 is located, distances L1 from the first boundary lines 121a to the gate electrodes 15 are not less than distances L2 from the second boundary lines 14a to the gate electrodes 15.

Specifically, the distances from the first boundary lines 121a to the gate electrodes 15 are greater than or equal to the distances from the second boundary lines 14a to the gate electrodes 15. When the distances from the first boundary lines 121a to the gate electrodes 15 are equal to the distances from the second boundary lines 14a to the gate electrodes 15, the sides of the black matrix 121 close to the gate electrodes 15 are aligned with the sides of the common electrode lines 14 close to the gate electrodes 15. Since the shading electrodes 161 are provided near the gate electrodes 15, the above arrangement can minimize the coverage area of the black matrix 121 while shielding light leakage areas near the gate electrodes 15, which not only improves the pixel aperture ratio, but also saves process costs, thereby further enhancing product competitiveness.

In the liquid crystal display panel 100 provided in the second embodiment of the present disclosure, the shading electrodes 161 cover the spacing areas AA' between the gate electrodes 15 and the common electrode lines 14, and electrically connect to the transparent electrodes 162, so that the shading electrodes 161 and the transparent electrodes 162 have the same potential, and in the dark state, the electric fields of the liquid crystals 13 in the spacing areas AA' remain same with the liquid crystals 13 in the pixel opening areas, which prevents abnormal deflection of the liquid crystals 13 due to the influence of the electric fields near the gate electrodes 15. When the panel is pressed or squeezed, even if the array substrate 11 and the color filter substrate 12 are offset and the abnormal alignment occurs, the liquid crystals 13 in the offset areas can maintain the dark and opaque state, thereby effectively preventing light leakage in the offset areas and improving the image quality of the liquid crystal display panel. In addition, the black matrix 121 and the transparent electrodes 162 are staggered, so that the pixel aperture ratio can also be increased, and the display quality of the display panel is further improved.

The present disclosure also provides a display device. The display device includes a liquid crystal display panel 100. The liquid crystal display panel 100 is the liquid crystal display panel 100 in any of the above-mentioned embodiments of the present disclosure. The specific structure of the liquid crystal display panel 100 can refer to the description of the foregoing embodiment, which will not be repeated here.

Compared with the liquid crystal display panel in the prior art, the liquid crystal display panel provided by the present disclosure covers the light leakage area between the gate electrodes and the common electrode lines with shading electrodes, and makes the shading electrodes and the transparent electrodes have the same potential, which solves the light leakage problem caused by abnormal deflection of the liquid crystals near the gate electrodes and improves the image quality of the liquid crystal display panel.

The embodiments of the present disclosure are described in detail above, and specific examples are used to illustrate the principles and implementation of the present disclosure. The descriptions of the above examples are only used to help understand the methods and core ideas of the present disclosure. At the same time, those ordinary skill in the art, based on the ideas of the present disclosure, can changes in the specific implementation and the application scope of the present disclosure. In summary, the content of this specification should not be construed as a limitation to the present disclosure.

What is claimed is:

1. A liquid crystal display panel, comprising an array substrate and a color filter substrate disposed oppositely, and liquid crystals disposed between the array substrate and the color filter substrate, wherein the array substrate includes common electrode lines, gate electrodes, and a pixel electrode layer, the pixel electrode layer is disposed on the common electrode lines and the gate electrodes, and spacing areas are provided between the common electrode lines and the gate electrodes in a direction parallel to a plane where the array substrate is located, the pixel electrode layer includes shading electrodes and transparent electrodes, the shading electrodes and the transparent electrodes are electrically connected, and the shading electrodes cover the spacing areas; and the shading electrodes and the transparent electrodes are disposed in a same layer, the shading electrodes are electrically connected to the transparent electrodes through vias, and patterns of the shading electrodes are stripe-shaped, wherein the color filter substrate comprises a black matrix, the black matrix is disposed at a side of the color filter substrate close to the array substrate, and the black matrix overlaps the shading electrodes, wherein the black matrix includes first boundary lines, the first boundary lines are located at sides of the black matrix close to the transparent electrodes, the common electrode lines comprise second boundary lines, and the second boundary lines are located at sides of the common electrode lines close to the gate electrodes; and in the direction horizontal to the plane where the array substrate is located, distances from the first boundary lines to the gate electrodes are not less than distances from the second boundary lines to the gate electrodes, wherein the transparent electrodes comprise main pixel electrodes and sub-pixel electrodes, and the main pixel electrodes and the sub-pixel electrodes are spaced apart; and the shading electrodes include first shading electrodes and second shading electrodes, the first shading electrodes are electrically connected to the main pixel electrodes, and the second shading electrodes are electrically connected to the sub-pixel electrode.

2. The liquid crystal display panel of claim 1, wherein the common electrode lines and the gate electrodes are provided in a same layer; and preset horizontal distances are provided between the shading electrodes and the gate electrodes in the direction parallel to the plane where the array substrate is located.

3. The liquid crystal display panel of claim 1, wherein in a direction perpendicular to the plane where the array substrate is located, the black matrix and the transparent electrodes are staggered.

4. The liquid crystal display panel of claim 1, wherein the shading electrodes and the transparent electrodes are integrally formed.

5. The liquid crystal display panel of claim 1, wherein orthographic projections of the first shading electrodes on the plane where the array substrate is located are first projections, and orthographic projections of the second shading electrodes on the plane where the array substrate is located are second projections, and the first projections and the second projections are symmetrically arranged with respect to orthographic projections of the gate electrodes on the plane where the array substrate is located.

6. A liquid crystal display panel, comprising an array substrate and a color filter substrate disposed oppositely, and liquid crystals disposed between the array substrate and the color filter substrate, wherein the array substrate includes common electrode lines, gate electrodes, and a pixel electrode layer, the pixel electrode layer is disposed on the common electrode lines and the gate electrodes, and spacing areas are provided between the common electrode lines and the gate electrodes in a direction parallel to a plane where the array substrate is located, and the pixel electrode layer includes shading electrodes and transparent electrodes, the shading electrodes and the transparent electrodes are electrically connected, and the shading electrodes cover the spacing areas, wherein the color filter substrate comprises a black matrix, the black matrix is disposed at a side of the color filter substrate close to the array substrate, and the black matrix overlaps the shading electrodes, wherein the black matrix includes first boundary lines, the first boundary lines are located at sides of the black matrix close to the transparent electrodes, the common electrode lines comprise second boundary lines, and the second boundary lines are located at sides of the common electrode lines close to the gate electrodes; and in the direction horizontal to the plane where the array substrate is located, distances from the first boundary lines to the gate electrodes are not less than distances from the second boundary lines to the gate electrodes, wherein the transparent electrodes comprise main pixel electrodes and sub-pixel electrodes, and the main pixel electrodes and the sub-pixel electrodes are spaced apart; and the shading electrodes include first shading electrodes and second shading electrodes, the first shading electrodes are electrically connected to the main pixel electrodes, and the second shading electrodes are electrically connected to the sub-pixel electrode.

7. The liquid crystal display panel of claim 6, wherein the common electrode lines and the gate electrodes are disposed in a same layer; and in the direction parallel to the plane where the array substrate is located, preset horizontal distances are provided between the shading electrodes and the gate electrodes.

8. The liquid crystal display panel of claim 6, wherein in a direction perpendicular to the plane where the array substrate is located, the black matrix and the transparent electrodes are staggered.

9. The liquid crystal display panel of claim 6, wherein the shading electrodes and the transparent electrodes are disposed in a same layer, and the shading electrodes are electrically connected to the transparent electrodes through vias.

10. The liquid crystal display panel of claim 9, wherein the shading electrodes and the transparent electrodes are integrally formed.

11. The liquid crystal display panel of claim 6, wherein orthographic projections of the first shading electrodes on the plane where the array substrate is located are first projections, and orthographic projections of the second shading electrodes on the plane where the array substrate is located are second projections, and the first projections and the second projections are symmetrically arranged with respect to orthographic projections of the gate electrodes on the plane where the array substrate is located.

12. The liquid crystal display panel of claim 6, wherein patterns of the shading electrodes are stripe-shaped.

13. A display device, comprising a liquid crystal display panel, wherein the liquid crystal display panel comprises an array substrate and a color filter substrate disposed oppositely, and liquid crystals disposed between the array substrate and the color filter substrate, wherein the array substrate includes common electrode lines, gate electrodes, and a pixel electrode layer, the pixel electrode layer is disposed on the common electrode lines and the gate electrodes, and spacing areas are provided between the common electrode lines and the gate electrodes in a direction parallel to a plane where the array substrate is located; and the pixel electrode layer includes shading electrodes and transparent electrodes, the shading electrodes and the transparent electrodes are electrically connected, and the shading electrodes cover the spacing areas, wherein the color filter substrate comprises a black matrix, the black matrix is disposed at a side of the color filter substrate close to the array substrate, and the black matrix overlaps the shading electrodes, wherein the black matrix includes first boundary lines, the first boundary lines are located at sides of the black matrix close to the transparent electrodes, the common electrode lines comprise second boundary lines, and the second boundary lines are located at sides of the common electrode lines close to the gate electrodes; and in the direction horizontal to the plane where the array substrate is located, distances from the first boundary lines to the gate electrodes are not less than distances from the second boundary lines to the gate electrodes, wherein the transparent electrodes comprise main pixel electrodes and sub-pixel electrodes, and the main pixel electrodes and the sub-pixel electrodes are spaced apart; and the shading electrodes include first shading electrodes and second shading electrodes, the first shading electrodes are electrically connected to the main pixel electrodes, and the second shading electrodes are electrically connected to the sub-pixel electrode.

14. The display device of claim 13, wherein the common electrode lines and the gate electrodes are disposed in a same layer; and in the direction parallel to the plane where the array substrate is located, preset horizontal distances are provided between the shading electrodes and the gate electrodes.

15. The display device of claim 13, wherein in a direction perpendicular to the plane where the array substrate is located, the black matrix and the transparent electrodes are staggered.

\* \* \* \* \*